United States Patent Office 3,445,572
Patented May 20, 1969

3,445,572
INCREASING POULTRY EGGSHELL THICKNESS BY ORALLY ADMINISTERING ADRENERGIC COMPOUNDS
Lawrence J. Machlin, St. Louis, Mo., assignor to Monsanto Company, St. Louis, Mo., a corporation of Delaware
No Drawing. Filed Aug. 16, 1965, Ser. No. 480,178
Int. Cl. A61k 27/00; A23k 1/18
U.S. Cl. 424—264　　　　　　　　　　　　5 Claims

ABSTRACT OF THE DISCLOSURE

A method for increasing poultry eggshell thickness by orally administering to laying hens a feed composition containing an adrenergic compound in an amount in the range of from 1 to 50 milligrams per pound of feed.

---

This invention relates to feed compositions for poultry. More particularly this invention relates to poultry feed compositions which result in increased shell thickness in eggs from birds to which the compositions are fed.

Eggshell thickness is an important factor in the poultry industry. Many eggs are cracked or broken during transportation and handling periods prior to reaching the consumer and thus are a useless commodity on the household consumer market. The problem of breakage is a serious one and is related to eggshell thickness. Eggs with a greater shell thickness are more likely to reach the consumer market in usable condition than eggs having less substantial shells.

It has been found in accordance with the present invention that eggshell thickness is substantially increased by incorporating adrenergic compounds into a conventional poultry diet.

The term "adrenergic compound" as used herein and in the appended claims means compounds which when administered orally (1) induce epinephrine secretion in poultry or (2) have epinephrine-like (adrenergic) effects in poultry.

The adrenergic compounds which can be employed in the practice of the present invention include by way of example and not limitation nicotine, tyrosamine, commonly known as tyramine, tyrosine, amphetamine, ephedrine, cyclopentamine and the like. Mixtures of the above adrenergic compounds can be used in the practice of this invention if desired.

For the sake of brevity and simplicity the invention will be described hereinafter primarily with respect to amphetamine although the amounts and conditions discussed apply equally to all other adrenergic compounds.

The amount of amphetamine incorporated into the feed composition may vary from as little as about 1 milligram per pound of feed to as much as about 50 milligrams per pound of feed based on the air dry weight of said feed. While the epinephrine can be added in amounts below about 1 milligram per pound of feed, the improvement in eggshell thickness at such lower concentration is so slight as to be without effect for practical purposes. Conversely, while the proportion of amphetamine added can exceed about 50 milligrams per pound of feed no practical purpose is served by so doing inasmuch as no further increase of shell thickness is realized. Hence, for practical purposes, the amount of amphetamine added lies in the range from about 1 milligram to 50 milligrams per pound of feed and, in the preferred embodiment of the invention, is in the proportion of about 20 milligrams to 25 milligrams per pound of feed.

The amphetamine is incorporated into any or all components of the diet. For example, it is feasible to incorporate the amphetamine into a grit or shell component of the diet or as a distinct entity in an inert carrier such as drinking water as well as in the mash formulation. The water-insoluble amphetamine is incorporated into the drinking water consumed by poultry by forming a dispersion. This is usually accomplished with the aid of a suitable nontoxic dispersing agent. When incorporated into the water the amphetamine should be present in amounts from about 0.5 to 25 milligrams per pint of drinking water since poultry consume approximately twice as much water on a weight basis as feed.

In practicing one form of the present invention, the amphetamine is incorporated in an all-mash or an all-pellet diet. Alternatively, the amphetamine is incorporated in various dietary combinations such as: mash, pellets and grain; mash and pellets; grain and pellets; or mash and grain. The amphetamine can be added to the diet as the pure, dry powder, as a stabilized concentrate wherein the amphetamine is coated with a protective material such as gelatine or gelatine and sugar, as an adsorbate on silica gel, oatmeal, soybean oil meal, ion-exchange resin or as a simple mixture with a diluent, such as cereal meal, and oil meal and stabilizers such as butylated hydroxytoluene, butylated hydroxyanisole, tocopherol or the like, in solution in a vegetable oil such as peanut oil, soybean oil, sesame oil, and the like (preferably including one or more stabilizers such as those enumerated above). An oil solution lends itself to mixing with or spraying on the basal diet. In addition, an emulsion or dispersion in peanut oil, soybean oil, or the like may be made and these are particularly adapted for aqueous compositions used as drinking water.

Specifically, the following mash formulation, incorporating from 1 to 50 milligrams of amphetamine per pound of diet, is particularly effective:

| | Parts by total wt. |
|---|---|
| Vegetable proteins | 5–20 |
| Animal proteins | 0–20 |
| Minerals | 2–9 |
| Vitamin concentrates | 0–8 |
| Lipids | 0–10 |
| Cereals | 40–80 |

In the foregoing formulation, for example: vegetable proteins are soybean oil meal, cottonseed meal, and corn gluten meal; animal proteins are fish meal, meat and bone scrap, and dried milk; minerals are phosphorous providing compounds such as dicalcium phosphate, calcium providing compounds such as calcium carbonate, and ordinary salt; vitamin concentrates provide vitamins A, D, E, K, riboflavin, niacin, choline and pantothenic acid; lipids are fats such as tallow and lard and oils such as cottonseed oil and soybean oil; and cereals are corn, oats, wheat barley, middlings, bran and red dog flour. In addition, to the foregoing formulation are added unidentified factor carriers such as: alfalfa to supply the alfalfa factor, whey to supply the whey factor; meat scrap, fish meal or liver to supply the liver factor; corn distillers' solubles; and strepomyces fermentation residue to supply the fermentation factor. In addition to the nutrient factors provided by the foregoing materials, other factors are provided by antibiotics, arsenicals and the like, which are of value directly or indirectly in preventing or treating diseases or in stimulating feed consumption. Preferably, the amphetamine is incorporated into the feed first by premixing in an appropriate proportion with from ¼% to 2% of the final feed and then uniformly distributing the premix throughout the final feed.

The following examples will serve to illustrate the present invention. Parts and percent are by weight unless otherwise indicated.

Example 1

Four groups of sixteen White Leghorn hybrids hens starting at 14 months of age are fed for 84 days on the following feed composition.

| Component: | Lbs./cwt. |
|---|---|
| Soybean oil meal (50% protein) | 18.6 |
| Dehydrated alfalfa meal | 2.50 |
| Trace mineral mixtures [1] | 0.50 |
| Calcium carbonate | 5.60 |
| Dicalcium phosphate | 3.00 |
| Vitamin concentrate [2] | 1.20 |
| Fat (tallow) | 2.00 |
| Methionine hydroxy analog | 0.05 |
| Ethoxyquin (an antioxidant) | 0.0125 |
| Yellow corn | 66.5375 |

[1] The trace minerals consist of:

| | Lbs./cwt. |
|---|---|
| Magnesium sulfate | 0.260 |
| Ferric citrate | 0.150 |
| Potassium iodide | 0.005 |
| Zinc chloride | 0.025 |
| Manganese oxide | 0.030 |
| Copper sulfate | 0.030 |
| Total | 0.500 |

[2] The vitamin supplements consist of:

| | Mg. (1.2 lb.) |
|---|---|
| Vitamin A (3000 USP units/gm.) | 160,000 |
| Vitamin D$_3$ (3000 IC units/gm.) | 18,000 |
| Riboflavin | 312 |
| Niacin | 2,880 |
| d-Pantothenic acid | 1,008 |
| Choline chloride (87% choline) | 82,958 |
| Vitamin B$_{12}$ | 0.72 |
| Menadione sodium bisulfite | 43 |
| Thiamine | 192 |
| Pyridoxine | 312 |
| Folic acid | 60 |
| Biotin | 9.6 |
| Inert | 279,505 |
| Total | 545,280 |

Group 2 received the same diet as Group 1 except that 10 milligrams of amphetamine are added per pound of feed. Groups 3 and 4 also received the same diet as Group 1 except that 20 and 40 milligrams of amphetamine are added per pound of feed. During the 3rd and 6th week of the experiment eggs are collected from all birds on five consecutive days. The eggs are stored overnight at 1° C. On each morning following collection the eggs are broken out of their shells individually. The shells are carefully washed with water to remove albumen, dried at 105° C. in a vacuum oven for 16 hours and weighed. The surface area of the shell is calculated using the formula $S = 4.67W^{2/3}$ wherein S is shell surface area in centimeters squared and W is eggshell weight in grams. Shell thickness is expressed as mg./cm.$^2$. Results vary with each egg but those given in Table 1 below can be attained.

Table 1.—Effect of amphetamine on eggshell thickness

| Amphetamine mg./lb.: | Eggshell thickness, mg./cm.$^2$ |
|---|---|
| 0 | 13.0 |
| 10 | 13.1 |
| 20 | 14.5 |
| 50 | 14.7 |

In practicing the present invention, preferably feed incorporating the stated proportion of amphetamine is provided continuously over a predetermined period of life span measured in terms of weeks or months. However, it is to be understood that in the foregoing process broadly, the stated proportion of amphetamine or its equivalent should be considered in relation to an overall diet for the predetermined period of life span rather than merely for a specific dietary formulation. Thus in general over a period of several weeks, a typical individual fowl, consuming on the average from 0.1 to 0.3 pound of diet per day, should receive on the average from 0.1 to 15 milligrams of amphetamine or its equivalent per day. In other words it would be possible to vary the diet from day to day so as to incorporate at any given time a quantity of amphetamine or its equivalent falling outside of the stated range, although the average quantity of amphetamine or its equivalent measured over several days would fall within the stated range.

What is claimed is:

1. A method of increasing poultry eggshell thickness which comprises orally administering to laying hens a diet containing as an essential ingredient therein an adrenergic compound selected from the group consisting of amphetamine, tyramine, nicotine and cyclopentamine, said adrenergic compound being present in the proportion of about 1 to 50 milligrams for each pound of said diet.

2. The method of claim 1 wherein the andrenergic compound is amphetamine.

3. The method of claim 1 wherein the andrenergic compound is tyramine.

4. The method of claim 1 wherein the andrenergic compound is nicotine.

5. The method of claim 1 wherein the andrenergic compound is cyclopentamine.

References Cited

UNITED STATES PATENTS 2,974,043  3/1961  Hochberg et al. _____ 99—4

OTHER REFERENCES

Cunningham: Poultry Sci., vol. 42, 1963, pp. 1197–202.
Ellison: Poultry Sci., vol. 44, May 1965, pp. 896–898.
Thornton: Poultry Sci., vol. 41, 1962, pp. 1832–1835.
Grollman: Pharmacology and Therapeutics, Lea & Febiger, Philadelphia, sixth ed., Jan. 14, 1965, pages 314–319, 324, 325 and 329–330.

RAYMOND N. JONES, Primary Examiner.

H. H. KLARE III, Assistant Examiner.

U.S. Cl. X.R.

99—4; 424—325